(12) United States Patent
Strang et al.

(10) Patent No.: US 8,851,494 B1
(45) Date of Patent: Oct. 7, 2014

(54) COMBINED STEP/MUFFLER HOUSING FOR A LAND VEHICLE

(71) Applicants: Christopher E. Strang, Chesapeake, VA (US); Christine Strang, Chesapeake, VA (US)

(72) Inventors: Christopher E. Strang, Chesapeake, VA (US); Christine Strang, Chesapeake, VA (US)

( * ) Notice: Subject to any disclaimer, the term of this patent is extended or adjusted under 35 U.S.C. 154(b) by 0 days.

(21) Appl. No.: 13/670,512

(22) Filed: Nov. 7, 2012

Related U.S. Application Data

(60) Provisional application No. 61/631,760, filed on Jan. 11, 2012.

(51) Int. Cl.
*B60K 3/00* (2006.01)

(52) U.S. Cl.
USPC .......................................... 280/163; 280/164.1

(58) Field of Classification Search
USPC .............. 280/163, 164.1, 166, 169, 762, 782; 296/75; D12/194; 180/309
See application file for complete search history.

(56) References Cited

U.S. PATENT DOCUMENTS

| | | | |
|---|---|---|---|
| 4,023,821 A * | 5/1977 | Eiland | 280/291 |
| D248,463 S | 7/1978 | Barnes | |
| 5,501,475 A | 3/1996 | Bundy | |
| 6,179,313 B1 * | 1/2001 | Christensen | 180/219 |
| 6,622,821 B2 * | 9/2003 | Butler | 181/270 |
| 6,921,327 B2 | 7/2005 | Urash | |
| 7,121,571 B2 * | 10/2006 | Savage et al. | 280/291 |
| 7,731,212 B2 * | 6/2010 | Storer | 280/163 |
| 2002/0153196 A1 * | 10/2002 | Dooley | 181/228 |
| 2005/0090193 A1 | 4/2005 | Urash | |
| 2008/0111345 A1 * | 5/2008 | Springer | 280/291 |
| 2009/0033058 A1 * | 2/2009 | VanderGriend et al. | 280/164.1 |

* cited by examiner

*Primary Examiner* — John Walters
*Assistant Examiner* — Brian Swenson
(74) *Attorney, Agent, or Firm* — RG Patent Consulting LLC; Rachel Gilboy

(57) ABSTRACT

A combined step/muffler housing for a land vehicle is mounted on a land vehicle immediately subadjacent to a doorway through which a user enters or exits the motor vehicle. The unit includes a housing on which is mounted steps that can have non-slip coatings and the housing contains a muffler which is fluidically connected to the engine of the motor vehicle.

2 Claims, 1 Drawing Sheet

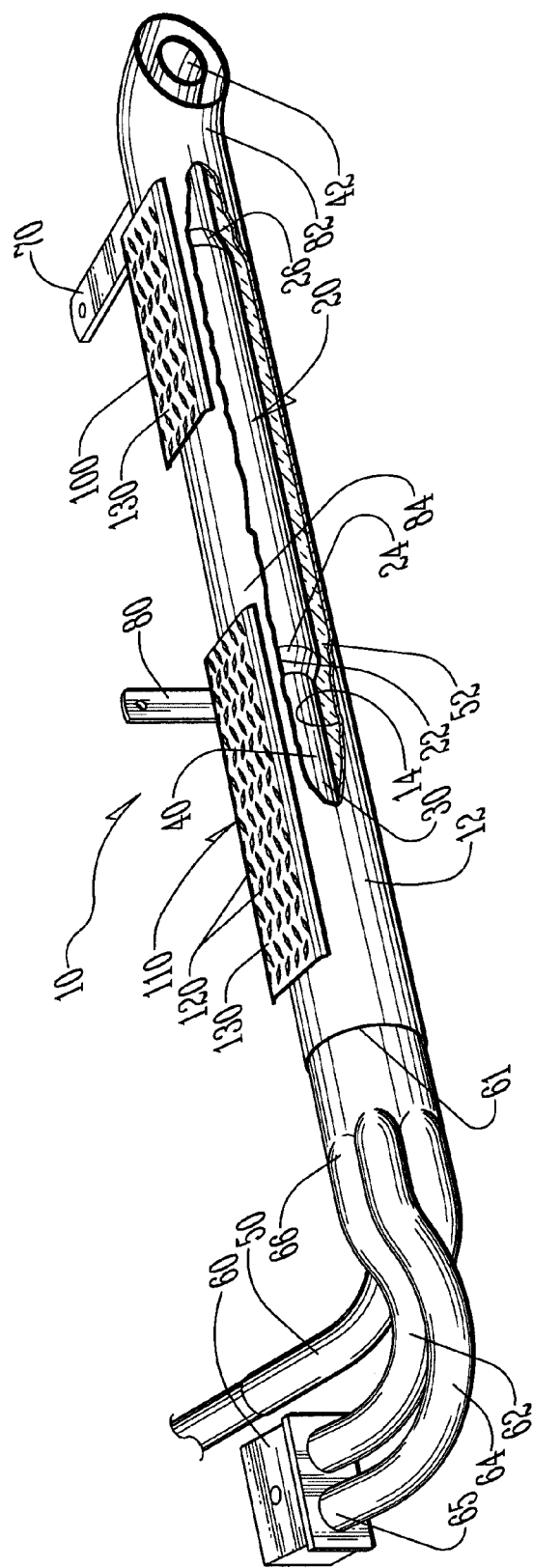

COMBINED STEP/MUFFLER HOUSING FOR A LAND VEHICLE

CROSS REFERENCE TO RELATED APPLICATION

The present application claims the benefit of the filing date Jan. 11, 2012 of earlier-filed Provisional Patent Application Ser. No. 61/631,760 filed by the present inventive entity.

TECHNICAL FIELD OF THE INVENTION

The present invention relates to the general art of motor vehicles, and to the particular field of accessories for land vehicles.

BACKGROUND OF THE INVENTION

In general, exhaust pipes function to expel waste gases produced in the combustion chamber of an engine. For this reason, the exhaust pipe is fluidically connected on one end thereof to an exhaust port of the engine and have an exit port located spaced apart from the engine, generally near the rear of a vehicle. The exhaust pipe thus extends along the length axis of the vehicle. Generally, in the past, the exhaust pipe has been located near the longitudinal centerline of vehicle.

Today's new vehicles normally are not provided with exterior steps. Therefore, many pickup truck owners add steps to their trucks just below either the driver's side door or the passenger's side door, or below both these doors. The reasons for adding steps to a truck include both functional and aesthetic considerations.

Steps make entering the truck's cab easier, particularly for very young or old people, for individuals having short legs, and for person's wearing garments, such as tight skirts, which restrict the height which the individual's leg and foot may be raised in order to step into the cab.

Therefore, the steps must be strong in order to support the weight of a person as he or she enters and exits the cab. Strictly from a standpoint of strength, the ideal material for constructing a truck step would be mild or carbon steel. However, steps constructed of mild steel are generally not very attractive, even if painted, and the carbon steel will eventually rust from the moisture it is exposed to in this service. Thus truck steps constructed of carbon steel are not very popular with truck owners.

On the other hand, from a purely aesthetic standpoint, truck steps constructed of stainless steel are most attractive. Additionally, stainless steel truck steps remain attractive for years because stainless steel does not rust like mild steel when exposed to the elements. However, stainless steel is a more expensive material than mild steel. Also stainless steel is difficult and costly to shape into the proper configuration to form a truck step and to polish after being properly formed. In order to reduce the cost of their product and thereby make their product more cost competitive in the marketplace, some manufacturers of truck steps have reduced the thickness of the stainless steel used in constructing their steps and have reduced support structures employed to secure the steps to the truck frame. As a result of such changes, these stainless steel truck steps, although quite attractive, are essentially non-functional because they are so structurally weak that they cannot bear the weight of an individual without bending or breaking completely off the vehicle.

Many vehicles, particularly, heavy duty trucks, specifically those of a cab-over-engine configuration, are known for poor cab accessibility due to the presence of a large front wheel below the cab entrance. In this respect, previous cabover heavy duty trucks offer only narrow steps within the body for a driver as he climbs up into the cab. Further, the area of a truck body within which a step may be formed is restricted in height by the cab structure itself, i.e., the space available between the cab floor and the underlying wheel well, or the height of a bumper side wall.

On the other hand, the aerodynamics of a truck cab can be substantially compromised by attachments, such as steps, extending beyond the body of the cab during operation, especially at highway speeds, resulting in additional parasitic power usage with a corresponding reduction in fuel economy and increased emissions.

Various types of steps can be added onto a pickup truck to allow a person to step thereon in order to facilitate the person's entry and exit from the pickup. One such step is a universal stainless steel truck step disclosed in U.S. Pat. No. 5,501,475 granted on Mar. 26, 1996.

The drawback with each of these add-on types of vehicle steps is that they rigidly attach to the vehicle and extend outward from under the vehicle where they can be in the way when they are not being used.

There is further need for a workable step into a motor vehicle as evidenced by the fact that, in many large vehicles such as a Class A motorhome the floor in the driver's area is often 3½ feet or more above the ground. Also in many of these large vehicles the driver sits nearly over the front wheel. It is impractical to employ a retractable step of the type commonly used in the middle of the passenger side on many Class A motorhomes, since it would have to be installed where the front wheel is located.

Therefore, there is a need for a step device for use on a land vehicle which is efficient and does not detract from the overall efficiency of the vehicle.

SUMMARY OF THE INVENTION

These, and other, objects are achieved by a combined step/muffler housing for a land vehicle which comprises: a housing located outside the perimeter of the land vehicle and immediately subadjacent to a doorway of the land vehicle in position to be stepped on when a user enters of exits the motor vehicle via the doorway, the housing acting as a running board for the doorway of the land vehicle; support brackets fixedly mounting the housing on the land vehicle; a muffler located inside the housing, with the housing acting as a combined step and muffler housing; and a step element fixedly mounted on the housing to be oriented and positioned to support a user when that user steps onto the housing when entering or exiting the motor vehicle via the doorway. A non-slip surface is located on the step element in position to be stepped on by a user when entering or exiting the land vehicle via doorway. The combined step/muffler housing can include multiple steps.

BRIEF DESCRIPTION OF THE DRAWING FIGURE

FIG. 1 is a perspective view of a combined exhaust pipe/step embodying the present invention.

DETAILED DESCRIPTION OF THE PREFERRED EMBODIMENT OF THE INVENTION

Other objects, features and advantages of the invention will become apparent from a consideration of the following detailed description and the accompanying drawing.

Referring to the FIGURE, it can be understood that the present invention is generally embodied in combined muffler/step unit 10 which is mounted on a land vehicle, such as a truck, to perform two functions: to be the muffler part of the engine exhaust system; and to be a step which can be used to step into the vehicle.

Unit 10 includes a housing 12 located outside the perimeter of the land vehicle and immediately subadjacent to a doorway of the land vehicle in position to be stepped on when a user enters of exits the motor vehicle via the doorway, the housing acting as a running board for the doorway of the land vehicle. Housing 12 is hollow and has an inner surface 14. Housing 12 extends in the direction of a longitudinal axis of the land vehicle so it acts as a running board for the vehicle. A muffler element 20 is located in a hollow internal cavity 22 defined by the housing and has an inlet 24 and an outlet 26. A ceramic coated inlet pipe 30 with insulation 40 located on the outside thereof to protect the housing from the inlet pipe and fluidically connects the engine of the motor vehicle to the muffler. The inlet pipe extends from the engine of the vehicle to the muffler element to conduct engine exhaust from the engine to an exit port 42 via a conduit 50 which is isolated and insulated with insulation 52 to keep engine exhaust properly contained. The insulation can be cloth or other suitable material as will be understood by those skilled in the art. A support bracket 60 is located within the perimeter of the chassis of the land vehicle and is fixedly mounted to an undersurface thereof and supports the aft end 61 of the unit via support pipe elements 62 and 64. Each of the support pipe elements has a first end, such as end 65 of element 64, fixedly attached to support bracket 60 and a second end, such as end 66 of element 62, fixedly attached to the housing adjacent to aft end 61 of the housing. First and second brackets 70 and 80 are located adjacent to the forward end 82 of the unit and adjacent to the midpoint 84 of the unit, respectively, securely support the unit so it will remain stable and in place even if a person places their weight on the unit as will happen when the unit is used as a step into the vehicle.

A first step 100 is securely mounted on the outer shell of the housing adjacent to the first bracket, the first step being horizontally oriented and having a step surface presented upwardly and located immediately subadjacent to the doorway of the land vehicle when the first step surface is mounted on the housing and the housing is mounted on the land vehicle, the first step surface having a non-slip coating thereon.

A second step 110 is securely mounted on the outer shell of the housing adjacent to the second bracket, the second step being horizontally oriented and having a step surface presented upwardly and located immediately subadjacent to the doorway of the land vehicle when the second step is mounted on the housing and the housing is mounted on the land vehicle, the second step surface having a non-slip coating thereon.

Diamond ridge plates 120 are located on an upper surface 130 of each step so a user will not slip when the unit is used as a step.

The exhaust system of the motor vehicle will be suitably designed so exhaust gases flow into the pipe 50. Since the design of the engine per se is not the subject of this invention, the elements and considerations associated with such design will not be discussed or claimed.

It is understood that while certain forms of the present invention have been illustrated and described herein, it is not to be limited to the specific forms or arrangements of parts described and shown.

What is claimed is:

1. A combined step/muffler housing for a land vehicle comprising:
  A) a mounting system ad adapted to be fixedly attached to a land vehicle subadjacent to a doorway of the land vehicle in position to be used as a step into and out of the land vehicle via the doorway including
    (1) a support bracket located beneath the land vehicle and mounted on the chassis of the land vehicle, and
    (2) a support pipe element system having two support pipes, each support pipe having a first end fixedly attached to the first bracket and extending outwardly away from the first support bracket toward the side of the land vehicle and a second end which is located outside the perimeter of the land vehicle and subadjacent to the doorway of the land vehicle;
  B) a housing located subadjacent to the vehicle doorway and outside the perimeter of the land vehicle, the housing having
    (1) an outer shell which defines a hollow internal cavity and which extends in the direction of a longitudinal axis of the land vehicle,
    (2) a first end fixedly attached to the second ends of the support pipes, and
    (3) a second end;
  C) cloth insulation on an internal surface, of the housing in the internal cavity;
  D) a muffler for the land vehicle located inside the internal cavity; the muffler having an inlet and an outlet, with the muffler outlet being located outside the housing,
  E) a muffler inlet pipe fluidically connected to the muffler and fluidically connected to an engine of the motor vehicle to conduct exhaust gas from the engine to the muffler;
  F) coating on the muffler inlet pipe;
  G) a first bracket located near the second end of the housing for fixedly mounting the housing to the land vehicle;
  H) a second bracket located between the first and second ends of the housing for fixedly mounting the housing to the land vehicle;
  I) a first step mounted on the outer shell of the housing adjacent to the first bracket, the first step being horizontally oriented and having a step surface presented upwardly and located immediately subadjacent to the doorway of the land vehicle when the first step surface is mounted on the housing and the housing is mounted on the land vehicle, the first step surface having a non-slip coating thereon; and
  J) a second step mounted on the outer shell of the housing adjacent to the second bracket, the second step being horizontally oriented and having a step surface presented upwardly and located immediately subadjacent to the doorway of the land vehicle when the second step is mounted on the housing and the housing is mounted on the land vehicle, the second step surface having a non-slip coating thereon.

2. The combined step/muffler housing defined in claim 1 wherein the non-slip coatings on the first and second step surfaces include diamond plates.

* * * * *